United States Patent
Huang

(10) Patent No.: US 12,273,280 B2
(45) Date of Patent: Apr. 8, 2025

(54) RESOURCE ALLOCATION SYSTEM AND METHOD FOR A CLOUD ENVIRONMENT

(71) Applicant: WISTRON CORP., New Taipei (TW)

(72) Inventor: Yuan Fu Huang, New Taipei (TW)

(73) Assignee: WISTRON CORP., New Taipei (TW)

( * ) Notice: Subject to any disclaimer, the term of this patent is extended or adjusted under 35 U.S.C. 154(b) by 48 days.

(21) Appl. No.: 18/329,619

(22) Filed: Jun. 6, 2023

(65) Prior Publication Data
US 2024/0364640 A1 Oct. 31, 2024

(30) Foreign Application Priority Data
Apr. 28, 2023 (TW) .................. 112116007

(51) Int. Cl.
*H04L 47/83* (2022.01)
*G06F 9/50* (2006.01)
*H04L 47/76* (2022.01)

(52) U.S. Cl.
CPC ............... *H04L 47/83* (2022.05); *G06F 9/50* (2013.01); *H04L 47/76* (2013.01)

(58) Field of Classification Search
CPC ............ H04L 47/83; H04L 47/76; G06F 9/50
See application file for complete search history.

(56) References Cited

U.S. PATENT DOCUMENTS

| | | | | |
|---|---|---|---|---|
| 11,632,329 B2* | 4/2023 | Yang | ............... | H04L 47/125 370/235 |
| 2022/0326999 A1* | 10/2022 | Penney | ................. | G06F 9/5027 |
| 2023/0292291 A1* | 9/2023 | Huang | ................... | G06N 3/063 |
| 2024/0015080 A1* | 1/2024 | Illikkal | ............... | H04L 41/5019 |

FOREIGN PATENT DOCUMENTS

| | | |
|---|---|---|
| CN | 114691303 A | 7/2022 |
| CN | 115269123 A | 11/2022 |

OTHER PUBLICATIONS

Chinese language office action dated Dec. 15, 2023, issued in application No. TW 112116007.

* cited by examiner

*Primary Examiner* — Shirley X Zhang
(74) *Attorney, Agent, or Firm* — McClure, Qualey & Rodack, LLP

(57) ABSTRACT

A resource allocation method for a cloud environment includes steps performed by one or more servers. These steps include: obtaining an initial resource requirement, generating a first deployment parameter set according to the initial resource requirement by a first prediction model, configuring the cloud environment according to the first deployment parameter set by a resource allocator, obtaining and inputting the requests to a machine learning model in the cloud environment and generating a real resource requirement, generating a predicted resource requirement at least according to the real resource requirement by a second prediction model, when detecting that the cloud environment is in a busy state according to the predicted resource requirement by the resource allocator, generating a second deployment parameter set according to the real resource requirement by the first prediction model; and reconfiguring the cloud environment according to the second deployment parameter set by the resource allocator.

20 Claims, 2 Drawing Sheets

RESOURCE ALLOCATION SYSTEM AND METHOD FOR A CLOUD ENVIRONMENT

CROSS-REFERENCE TO RELATED APPLICATIONS

This non-provisional application claims priority under 35 U.S.C. § 119(a) on Patent Application No(s). 112116007 filed in Taiwan, R.O.C. on Apr. 28, 2023, the entire contents of which are hereby incorporated by reference.

BACKGROUND

1. Technical Field

The present disclosure relates to artificial intelligence and cloud environments, particularly to a resource allocation system and method for the cloud environments.

2. Related Art

Artificial intelligence (AI) technology is introduced into factory automation processes to reduce operating costs. By collecting data and conducting big data analysis, AI application services at the production end can be used to judge product defects and achieve advanced manufacturing operations such as self-perception, automatic decision-making, and automatic execution. The use of AI technology in key manufacturing links can achieve the best production mode and enhance industrial competitiveness. On the other hand, transferring AI application services to cloud virtualization systems can reduce hardware construction and operating costs.

The computing resources occupied by the AI application service in cloud virtualization systems cannot be predicted in advance and usually rely on data scientists or engineers to allocate appropriate computing resources manually based on past experience. However, as the production line conditions change, problems such as insufficient resource allocation leading to service interruptions or excessive resource allocation causing resource waste may occur. This is a crucial issue that must be solved for smart factory automation and energy conservation.

SUMMARY

In view of the above, the present disclosure proposes a resource allocation system and method for a cloud environment to achieve automated resource allocation, uninterrupted artificial intelligence (AI) workloads, and resource conservation.

According to an embodiment of the present disclosure, a resource allocation method for a cloud environment is performed by one or more servers and includes following steps: obtaining an initial resource requirement; generating a first deployment parameter set according to the initial resource requirement by a first prediction model; configuring the cloud environment according to the first deployment parameter set by a resource allocator; obtaining and inputting a plurality of requests to a machine learning model in the cloud environment and generating a real resource requirement; generating a predicted resource requirement at least according to the real resource requirement by a second prediction model; in response to detecting that the cloud environment is in a busy state according to the predicted resource requirement by the resource allocator, generating a second deployment parameter set according to the real resource requirement by the first prediction model; and reconfiguring the cloud environment according to the second deployment parameter set by the resource allocator.

According to an embodiment of the present disclosure, a resource allocation system for a cloud environment includes a first server and a second server. The first server runs the cloud environment. The cloud environment receives and inputs a plurality of requests to a machine learning model and generates a real resource requirement. The second server is communicably connected to the first server. The second server executes a resource allocator to obtain an initial resource requirement, generates a first deployment parameter set according to the initial resource requirement by a first prediction model, configures the cloud environment according to the first deployment parameter set, generates a predicted resource requirement at least according to the real resource requirement by a second prediction model, in response to detecting that the cloud environment is in a busy state according to the predicted resource requirement, generates a second deployment parameter set according to the real resource requirement by the first prediction model; and reconfigures the cloud environment according to the second deployment parameter set.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

The system and method proposed by the present disclosure are suitable for dynamically configuring multiple resources on the production line for the AI workload.

Figure 1:
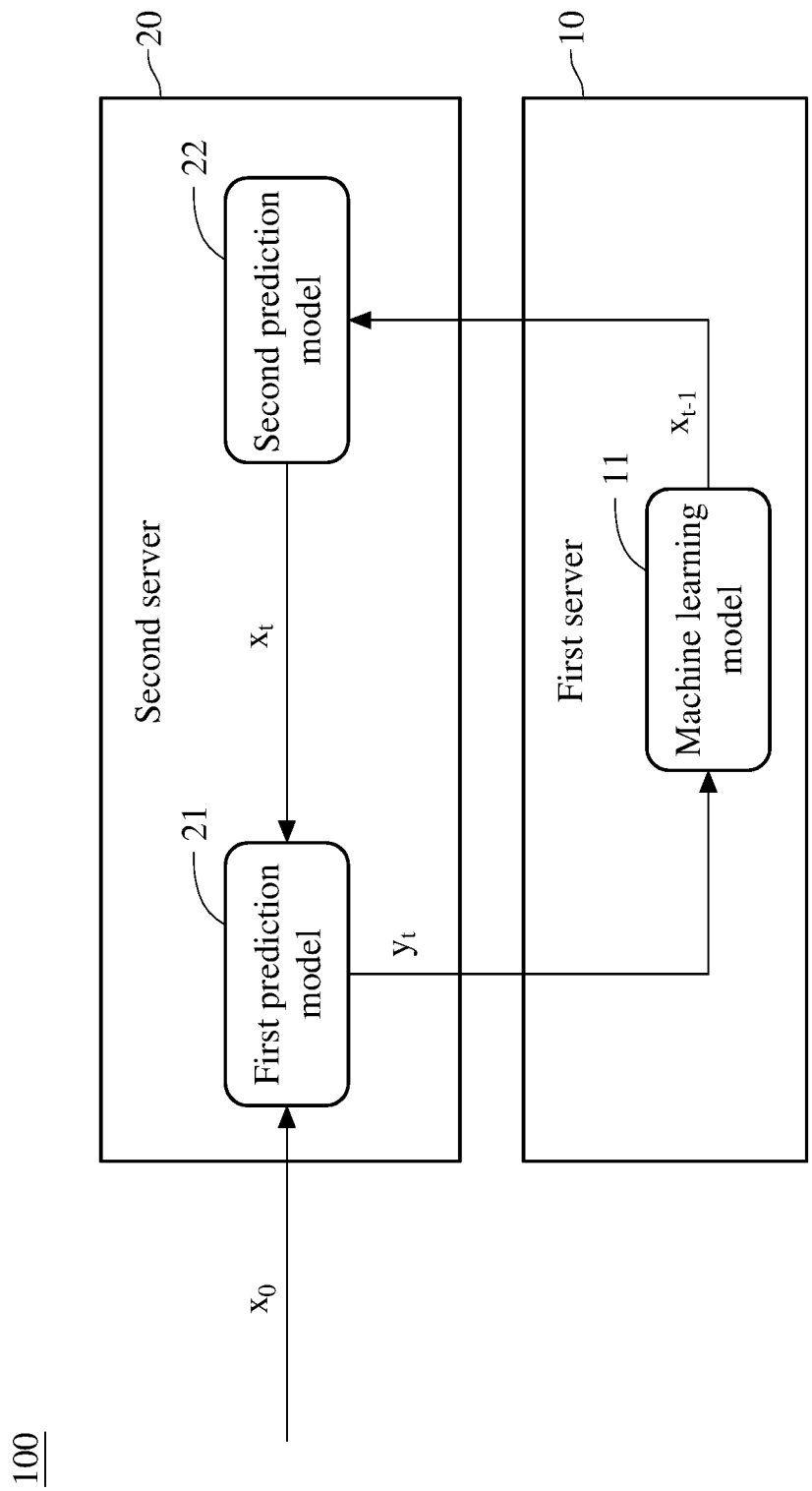
FIG. 1 is a function block diagram of a resource allocation system for a cloud environment according to an embodiment of the present disclosure.

FIG. 1 is a function block diagram of a resource allocation system for a cloud environment according to an embodiment of the present disclosure. As shown in FIG. 1, the resource allocation system 100 for the cloud environment according to an embodiment of the present disclosure includes a first server 10 and a second server 20. In an embodiment, the first server 10 and the second server 20 are computers or network hosts that can execute software.

The first server 10 is configured to execute the cloud environment. The cloud environment includes a plurality of remote physical resources and their management platforms. In an embodiment, the cloud environment is a cloud platform such as Kubernetes (K8S) or OpenStack configured to manage a plurality of remote physical resources. In another embodiment, the cloud environment is a virtual machine management platform such as KVM or VMware configured to manage a plurality of local resources. The cloud environment is configured to obtain and input a plurality of requests to the machine learning model 11 and generate a real resource requirement $x_{t-1}$. For example, when the present disclosure is used for automated optical inspection (AOI), the plurality of requests is a plurality of product photos that are sequentially input to the machine learning model 11 to determine whether the products in the photos have defects. The machine learning model 11 is, for example, Resnet50, Inception, EfficientNet, YOLOv7, etc. However, the present disclosure does not limit the data format or type of requests, nor does it limit the types of machine learning models 11.

The second server 20 is communicably connected to the first server 10. The second server 20 is configured to execute a resource allocator. In an embodiment, the resource allocator may adopt an autoscaler for vertical or horizontal scaling in Kubernetes (K8s). In another embodiment, the resource allocator may be implemented in hardware circuits or software. The resource allocator is configured to obtain an initial resource requirement $x_0$, generate a first deployment parameter set $y_1$ according to the initial resource requirement $x_0$ by the first prediction model 21, configure the cloud environment according to the first deployment parameter set $y_1$, and generate a predicted resource requirement at least according to the real resource requirement $x_{t-1}$ by a second prediction model 22. When the resource allocator detects that the cloud environment is in a busy state according to the predicted resource requirement, the resource allocator generates the second deployment parameter set $y_2$ according to the real resource requirement $x_{t-1}$ by the first prediction model 21 and reconfigures the cloud environment according to the second deployment parameter set $y_2$.

Figure 2:
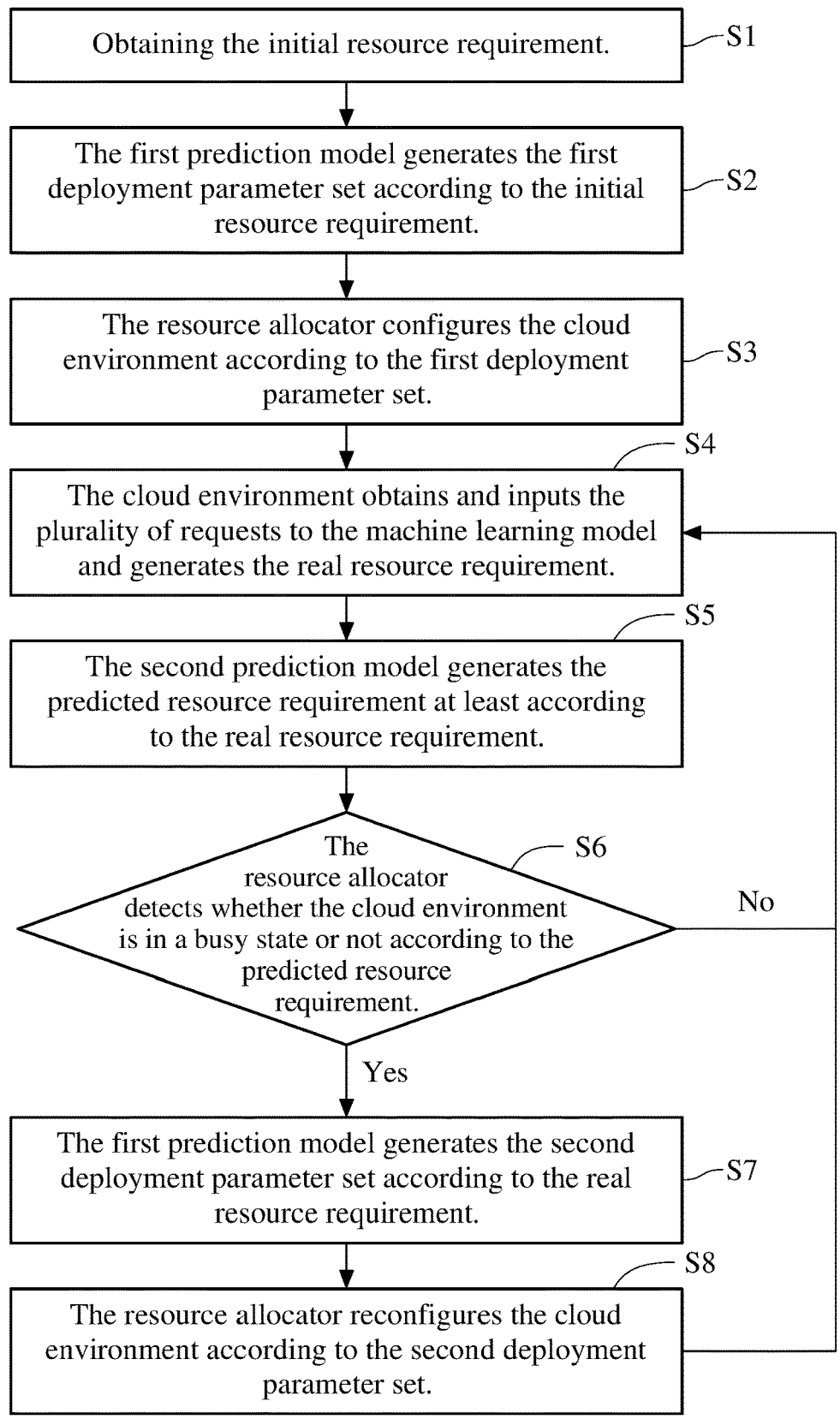
FIG. 2 is a flowchart of a resource allocation method for a cloud environment according to an embodiment of the present disclosure.

To provide a clear explanation of the implementation details of the resource allocator, please refer to FIG. 2. FIG. 2 is a flowchart of a resource allocation method for a cloud environment according to an embodiment of the present disclosure.

In step S1, the first server 10 obtains the initial resource requirement $x_0$ set by human. In an embodiment, the initial resource requirement $x_0$ includes at least one of a name of the machine learning model 11, a total number of requests corresponding to the plurality of requests, required response time for executing the machine learning model 11, and a total data throughput corresponding to the total number of requests. When the requests are images, the total data throughput, for example, is the product of the total number of requests and the size of an image file.

In step S2, the resource allocator running on the first server 10 generates the first deployment parameter set $y_1$ according to the initial resource requirement $x_0$ by the first prediction model 21. In other words, in step S2, the required computing resources are predicted according to the requirement of the AI workload. In an embodiment, since the relationship between the requirement of the AI workload and the computing resources is nonlinear, a neural network is adopted to implement the resource prediction model (such as the first prediction model 21). In an embodiment, the first prediction model 21 is a multilayer perceptron (MLP) model. In an implementation, the first deployment parameter set $y_1$ includes: a CPU utilization, a memory utilization, a network bandwidth and quality of service (QoS), and a GPU utilization. The training of the first prediction model 21 may be implemented by collecting historical data on the initial resource requirement $x_0$ and the first deployment parameter set.

In step S3, the resource allocator configures the cloud environment according to the first deployment parameter set $y_1$. Note that both the initial resource requirement $x_0$ and the first deployment parameter set $y_1$ are set and predicted before the machine learning model 11 starts operating. Once the machine learning model 11 starts operating, the resources required by the machine learning model 11 will be monitored in real-time through the process after step S3, and the first deployment parameter set $y_1$ will be adaptively updated to the second deployment parameter set $y_2$.

In step S4, the cloud environment obtains and inputs the plurality of requests to the machine learning model 11 and generates the real resource requirement $x_{t-1}$. In an embodiment, the real resource requirement $x_{t-1}$ includes at least one of the name of the machine learning model 11, real response time for completing all requests by the machine learning model 11, and a real total data throughput when executing the machine learning model 11. Regarding the real response time, for example, assuming there are 300 requests (e.g. image detection) and the required response time is 5 minutes, the real response time is the average time to respond to one request (e.g. image detection). Therefore, if the real response time exceeds 1 second, it will be considered as not meeting the initial resource requirement (since the average required time of the execution of the machine learning model 11 for each image detection is 1 second). In an embodiment, in the real operating scenario of the production line, the real total number of requests inputted to the machine learning model 11 is not fixed, and the resources allocated to the machine learning model 11 according to the first deployment parameter set $y_1$ may not meet the requirement of the response time. Therefore, it is necessary to monitor the real response time and total data throughput of the machine learning model 11 in real-time when it is operating. In an embodiment, the real resource requirement $x_{t-1}$ may be generated through the application programming interface (API) provided by K8s itself or by writing monitoring programs.

In step S5, the second prediction model 22 generates the predicted resource requirement at least according to the real resource requirement $x_{t-1}$. In an embodiment, after collecting real resource requirements at a plurality of time points (such as $x_{t-1}, x_{t-2}, x_{t-3}, \ldots, x_{t-L}$), the resource allocator inputs these real resource requirements to the second prediction model 22. In other words, step S5 is performed only after step S4 has been executed a specified number of times. For example, if the specified number is 2, when step S4 is performed for the first time, the cloud environment inputs a plurality of first requests to the machine learning model 11 and generates a first real resource requirement; when step S4 is performed for the second time, the cloud environment inputs a plurality of second requests to the machine learning model 11 and generates a second real resource requirement. The second prediction model 22 generates the predicted resource requirement according to the first real resource requirement and the second real resource requirement.

In one embodiment, the predicted resource requirement includes at least one of the name of the machine learning model 11, the predicted number of requests for the next time point, the predicted response time for the next time point, and the predicted data throughput for the next time point. The predicted resource requirement has corresponding items to the initial resource requirement $x_0$, the difference is that the items of the initial resource requirement $x_0$ are manually predetermined, while the items of the predicted resource requirement are generated automatically by the model.

In an embodiment, the second prediction model 22 is vector autoregressive model (VAR). In another embodiment, the second prediction model 22 is long short term memory model (LSTM).

Overall, in order to meet the requirement of Service Level Agreement (SLA), it has to ensure the response time of AI workload. If the response time cannot meet the requirement, it means that the computing resources provided by the cloud environment for the workload are insufficient to cope with the current total data throughput, which will result in service congestion, delays or even failures, and adjusting the computing resources at this point cannot meet the requirement of service quality. Therefore, to solve such problems, the present disclosure uses the second prediction model 22 to predict the possible occurrence of service congestion in the future according to the relationship of time series, and uses the first prediction model 21 to predict the required computing resources, so as to allocate resources to the workload in advance. The training of the second prediction model 22 may be implemented by collecting historical data of the real resource requirement $x_{t-1}$ and predicted resource requirement.

In step S6, the resource allocator detects whether the cloud environment is in a busy state or not according to the predicted resource requirement. Step S7 is performed next if the cloud environment is busy, otherwise, step S4 is performed next for obtaining new requests to input to the machine learning model 11.

The detection of step S6 may adopt at least one of the following two embodiments. The first embodiment compares the required response time of the initial resource requirement $x_0$ with the predicted response time of the predicted resource requirement. If the predicted response time is greater than the required response time, the cloud environment is determined to be busy.

The second embodiment is applicable when step S4 is performed more than twice. For example, assuming that a specified number is 2, the resource allocator first calculates an average resource requirement according to the first real resource requirement and the second real resource requirement, and then calculates a distance between the predicted resource requirement and the average resource requirement. When the distance is greater than a threshold, the cloud environment is determined to be busy. In an embodiment, the distance is the Euclidean distance, and the threshold is the $95^{th}$ quantile of all calculated distances.

In an embodiment, before calculating the distance between the predicted resource requirement and the average resource requirement, a normalization step is performed on each of these two resource requirements. For example, assuming that the specified number is n, the resource allocator collects n real resource requirements at n different time points, such as $\{x_{t-n}, \ldots, x_{t-1}\} = \{(30 \text{ images}, 100 \text{ MB}, 2 \text{ s}), \ldots, (20 \text{ images}, 101 \text{ MB}, 3 \text{ s})\}$, where each real resource requirement includes three variables: the number of requests x1, the real total data throughput x2, and the real response time x3. The sample mean of each variable is calculated as follows from Equation 1 to Equation 3:

$$avg(x1) = (30 + \ldots + 20)/n \quad \text{(Equation 1)}$$

$$avg(x2) = (100 + \ldots + 21)/n \quad \text{(Equation 2)}$$

$$avg(x3) = (2 + \ldots + 3)/n \quad \text{(Equation 3)}$$

The calculation of the sample mean for each variable is as follows from Equation 4 to Equation 6:

$$\sigma 1 = \sqrt[2]{\sum\nolimits_{i1=t-n}^{i1=t-1} (x_{i1} - avg(x1))^2/n} \quad \text{(Equation 4)}$$

$$\sigma 2 = \sqrt[2]{\sum\nolimits_{i2=t-n}^{i2=t-1} (x_{i2} - avg(x2))^2/n} \quad \text{(Equation 5)}$$

$$\sigma 3 = \sqrt[2]{\sum\nolimits_{i3=t-n}^{i3=t-1} (x_{i3} - avg(x3))^2/n} \quad \text{(Equation 6)}$$

where i1-i3 are positive integers. The average value of real resource requirement, avg(x), and its standard deviation, σ, are calculated as following Equations 7 and Equation 8, respectively:

$$avg(x) = (avg(x1), avg(x2), avg(x3)) \quad \text{(Equation 7)}$$

$$\sigma = (\sigma 1, \sigma 2, \sigma 3) \quad \text{(Equation 8)}$$

Therefore, the normalized sample of the real resource requirement, $x_i = (x_{i1}, x_{i2}, x_{i3})$, is shown as following Equation 9:

$$((x_{i1} - avg(x1))/\sigma 1, (x_{i2} - avg(x2))/\sigma 2, (x_{i3} - avg(x3))/\sigma 3) \quad \text{(Equation 9)}$$

In step S7, the second deployment parameter set $y_2$ is generated by the first prediction model 21 according to the real resource requirement, $x_{t-1}$. In step S8, the resource allocator reconfigures the cloud environment according to the second deployment parameter set $y_2$. After step S8 is completed, step S4 is performed next to obtain new requests to input to the machine learning model 11.

In view of the above, the first prediction model and the second prediction model proposed in the present disclosure have the ability to predict the required computing resources over time, and thus predicting situations where service congestion occurs due to an increase in the total number of requests in future time points. Therefore, the present disclosure enables early allocation of computing resources to meet the requirement of increased traffic and prevent congestion. The adjustment of computing resources can be achieved through deploying parameter sets for scaling in/out or scaling up/down. The resource allocation system and method for the cloud environment proposed in the present disclosure have realized the prediction and dynamic adjustment of computing resources for AI workloads over time. The present disclosure enables the adjustment of resource allocation over time to meet response time requirements, allowing AI workloads to meet their requirements and operate normally.

Although embodiments of the present application are disclosed as described above, they are not intended to limit the present application, and a person having ordinary skill in the art, without departing from the spirit and scope of the present application, can make some changes in the shape, structure, feature and spirit described in the scope of the present application. Therefore, the scope of the present application shall be determined by the scope of the claims.

What is claimed is:

1. A resource allocation method for a cloud environment performed by one or more servers and comprising:
   obtaining an initial resource requirement;

generating a first deployment parameter set according to the initial resource requirement by a first prediction model;

configuring the cloud environment according to the first deployment parameter set by a resource allocator;

obtaining and inputting a plurality of requests to a machine learning model in the cloud environment and generating a real resource requirement;

generating a predicted resource requirement at least according to the real resource requirement by a second prediction model;

in response to detecting that the cloud environment is in a busy state according to the predicted resource requirement by the resource allocator, generating a second deployment parameter set according to the real resource requirement by the first prediction model; and reconfiguring the cloud environment according to the second deployment parameter set by the resource allocator.

2. The resource allocation method for the cloud environment of claim 1, wherein the plurality of requests is a plurality of first requests, and the real resource requirement is a first real resource requirement, and the method further comprises:

obtaining and inputting a plurality of second requests to the machine learning model in the cloud environment and generating a second real resource requirement;

wherein generating the predicted resource requirement at least according to the real resource requirement by the second prediction model comprises: generating the predicted resource requirement according to the first real resource requirement and the second real resource requirement by the second prediction model.

3. The resource allocation method for the cloud environment of claim 1, wherein the initial resource requirement comprises required response time to execute the machine learning model, and the predicted resource requirement comprises predicted response time; and detecting according to the predicted resource requirement by the resource allocator comprises: in response to the predicted response time being greater than the required response time, detecting that the cloud environment is in the busy state.

4. The resource allocation method for the cloud environment of claim 2, further comprising: calculating an average resource requirement according to the first real resource requirement and the second real resource requirement by the resource allocator; and wherein detecting according to the predicted resource requirement by the resource allocator comprises: in response to a distance between the predicted resource requirement and the average resource requirement being greater than a threshold, detecting that the cloud environment is in the busy state.

5. The resource allocation method for the cloud environment of claim 1, wherein the initial resource requirement further comprises at least one of a name of the machine learning model, a total number of the plurality of requests, and a total data throughput.

6. The resource allocation method for the cloud environment of claim 1, wherein the real resource requirement further comprises at least one of a name of the machine learning model and a real total data throughput when executing the machine learning model.

7. The resource allocation method for the cloud environment of claim 1, wherein the first deployment parameter set or the second deployment parameter set comprises at least one of a CPU utilization, a memory utilization, a network bandwidth and a quality or service, and a GPU utilization.

8. The resource allocation method for the cloud environment of claim 1, wherein the first prediction model is a Multilayer perceptron model.

9. The resource allocation method for the cloud environment of claim 1, wherein the second prediction model is a vector autoregressive model.

10. The resource allocation method for the cloud environment of claim 1, wherein the second prediction model is a long short term memory model.

11. A resource allocation system for a cloud environment comprising:

a first server running the cloud environment, wherein the cloud environment receives and inputs a plurality of requests to a machine learning model and generates a real resource requirement; and a second server communicably connected to the first server, wherein the second server executes a resource allocator to obtain an initial resource requirement, generate a first deployment parameter set according to the initial resource requirement by a first prediction model, configure the cloud environment according to the first deployment parameter set, generate a predicted resource requirement at least according to the real resource requirement by a second prediction model, generate a second deployment parameter set according to the real resource requirement by the first prediction model in response to detecting that the cloud environment is in a busy state according to the predicted resource requirement, and reconfigure the cloud environment according to the second deployment parameter set, wherein the first server and the second server are computers or network hosts that include a processor and a memory, which execute software.

12. The resource allocation system for the cloud environment of claim 11, wherein the plurality of requests is a plurality of first requests, and the real resource requirement is a first real resource requirement, the cloud environment is further configured to obtain and input a plurality of second requests to the machine learning model and generate a second real resource requirement;

wherein generating the predicted resource requirement at least according to the real resource requirement by the second prediction model comprises: generating the predicted resource requirement according to the first real resource requirement and the second real resource requirement by the second prediction model.

13. The resource allocation system for the cloud environment of claim 11, wherein the initial resource requirement comprises required response time to execute the machine learning model, and the predicted resource requirement comprises predicted response time; and detecting according to the predicted resource requirement by the resource allocator comprises: in response to the predicted response time being greater than the required response time, detecting that the cloud environment is in the busy state.

14. The resource allocation system for the cloud environment of claim 12, wherein the resource allocator further calculates an average resource requirement according to the first real resource requirement and the second real resource requirement; and wherein detecting according to the predicted resource requirement by the resource allocator comprises: in response to a distance between the predicted resource requirement and the average resource requirement being greater than a threshold, detecting that the cloud environment is in the busy state.

15. The resource allocation system for the cloud environment of claim 11, wherein the initial resource requirement further comprises at least one of a name of the machine learning model, a total number of the plurality of requests, and a total data throughput.

16. The resource allocation system for the cloud environment of claim 11, wherein the real resource requirement further comprises at least one of a name of the machine learning model and a real total data throughput when executing the machine learning model.

17. The resource allocation system for the cloud environment of claim 11, wherein the first deployment parameter set or the second deployment parameter set comprises at least one of a CPU utilization, a memory utilization, a network bandwidth and a quality or service, and a GPU utilization.

18. The resource allocation system for the cloud environment of claim 11, wherein the first prediction model is a Multilayer perceptron model.

19. The resource allocation system for the cloud environment of claim 11, wherein the second prediction model is a vector autoregressive model.

20. The resource allocation system for the cloud environment of claim 11, wherein the second prediction model is a long short term memory model.

* * * * *